Jan. 24, 1956 G. A. LYON 2,732,260
WHEEL COVER
Filed May 6, 1952
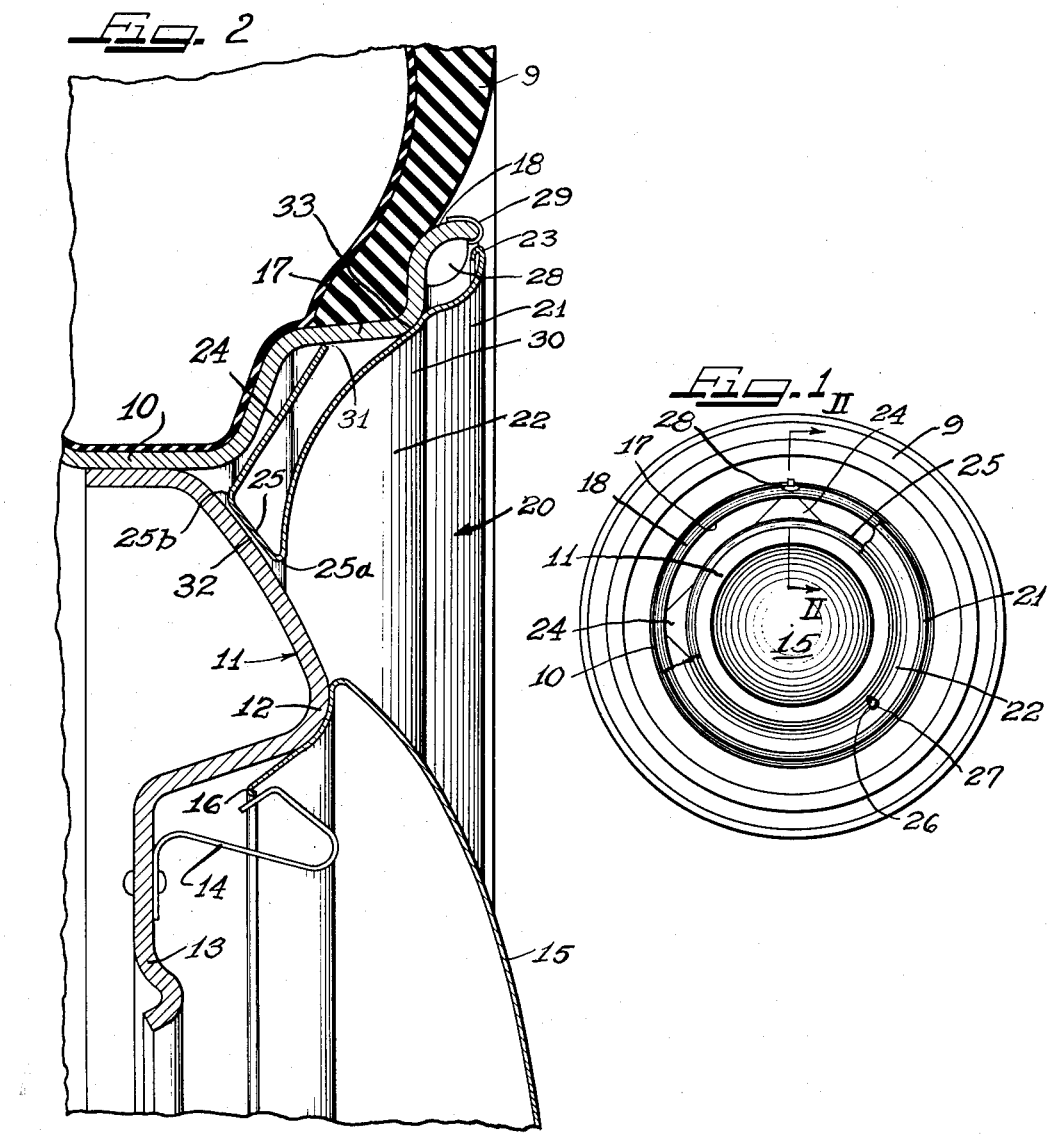
Inventor
GEORGE ALBERT LYON United States Patent Office 2,732,260
Patented Jan. 24, 1956

2,732,260

WHEEL COVER

George Albert Lyon, Detroit, Mich.

Application May 6, 1952, Serial No. 286,229

3 Claims. (Cl. 301—37)

This invention relates to ornamental trim for wheels and more particularly to a self-retained trim ring for an automobile wheel.

An object of this invention is to provide an automobile wheel trim ring which in addition to retaining itself on a wheel is adapted to be self-centering, as well as includes means limiting its movement into cooperation with the wheel.

Yet another object of this invention is to provide an automobile wheel trim which lends itself to economical manufacture on a large production basis.

Another object of this invention is to provide a wheel trim ring which can be applied to the tire rim of a wheel without in any way interfering with the use of conventional counterbalancing weights on the rim.

In accordance with the general features of this invention there is provided a trim ring for a wheel having a multi-flanged tire rim, which ring includes concentric radially inner and outer portions of curved cross section having at their junction a tire rim contacting portion for maintaining the outer ring portion out of contact with the rim and for centering the ring on a wheel; the inner portion being at its inner margin turned rearwardly back upon itself and the turned back portion being formed into a plurality of concealed inclined tire rim engaging elements for retaining the ring on the wheel.

Other objects and features of this invention will more fully appear from the following detailed description taken in connection with the accompanying drawings which illustrate a single embodiment thereof and in which Figure 1 is a side view of a wheel having a trim ring embracing the features of this invention applied thereto and being partly broken away to show the retaining fingers; and Figure 2 is an enlarged fragmentary radial sectional view taken on substantially the line II—II of Fig. 1.

As shown on the drawings:

In the accompanying drawings, which illustrate more or less the conventional automobile wheel, the reference character 9 designates generally a standard pneumatic tube and tire assembly mounted in the usual way on shouldered flanges of a multi-flange drop center tire rim 10. This rim in turn is carried in the usual way on a body part 11, comprising a dished stamping including an outer nose portion 12 and the usual bolt-on flange 13. Riveted to the bolt-on flange 13 is a plurality of spaced conventional hub cap retaining springs clips 14 which are of the so-called inverted type.

Detachably cooperable with the nose portion 12 of the body part is a metallic hub cap 15, including a continuous turned edge 16 in detachable engagement with the free extremities of the spring clips 14.

The tire rim 10 has an intermediate generally axially and radially outwardly slanting flange 17 which merges with a terminal flange 18. The terminal flange is, of course, of the usual structure including a generally radially outwardly extending portion and a curved generally axially extending extremity portion.

This invention is concerned with the provision of an annular metallic trim ring 20 for covering the exposed side flanges of the tire rim, as well as the junction of the tire rim with the body part 11. It is well known that this junction constitutes an "eye sore" if not concealed, due to the collection of dirt and corrosive material therein in the use of the wheel.

The trim ring 20 comprises radially outer and inner concentric portions 21 and 22, each of a concave-convex cross section but curved in opposite directions.

The outer edge of the outer portion 21 is turned back upon itself at 23 and terminates short of the outer edge of the tire rim terminal flange 18 so as to be spaced therefrom. The inner margin of the inner portion 22 is turned back upon itself to form a plurality of inclined retaining fingers 24 extending in concealed relation and substantially spaced behind the portion 22. These fingers are connected to the inner edge of the body portion 22 by a turned back flange 25 joined on a rigidifying small radius juncture rib 25a to the body portion. The flange 25 extends preferably generally frusto-conically generally radially outwardly and axially inwardly divergently relative to the ring body 22 and is disposed, when the ring is on the wheel, in close proximity to the body part 11 but preferably spaced therefrom as indicated at 32.

Each of the fingers 24 is joined to the distal terminus of the flange 25 on a rigidifying small radius juncture rib 25b and extends angularly therefrom obliquely axially and radially outwardly spaced behind the ring body 22. At its extremity 31 each finger is adapted to have a tensioned biting retaining engagement with the intermediate flange 17 of the tire rim behind the ring for retaining the ring on the wheel.

It should also be noted that the trim ring 20 may be provided with an opening 26 (Fig. 1) so that the usual valve stem 27 of the tire and tube assembly 9 can project therethrough.

Due to the fact that the outer ring portion 21 is spaced from the outer flange of the tire rim 10 and defines a substantial chamber therebehind, clearance is provided for the accommodation of a balancing weight 28. This weight may be of any conventional construction and is held on the edge of the rim by means of a spring clip 29.

A feature of my invention relates to providing the ring 20, adjacent the junction of the portions 21 and 22, with a somewhat flattened although preferably slightly rounded contact groove rib portion 30 for bearing on the shoulder 33 of the tire rim 10. This contact portion 30 is so arranged with reference to the peripheral margin of the ring that it is the only portion that actually contacts the rim outside of the tips 31 of the fingers 24. The rib portion 30 also serves to center the trim ring or cover on the wheel. It will be observed that not only does the seating shoulder 30 of the trim ring maintain the flange 25 out of contact with the body but also keeps the retaining fingers 24 from engaging the adjacent side flange of the tire rim.

In the application of the trim ring to the wheel, the hole 26 is first aligned with the valve stem 27 and then the ring is pressed axially toward the wheel, during which operation the tips 31 of the fingers 24 slide along the tire rim intermediate flange surface until the contact portion 30 bottoms on the shoulder 33. Due to the angle at which the fingers 24 are disposed and the gripping tension thereof against the rim flange any tendency to jar the ring loose or to remove the same results in an enhancement of the gripping engagement.

It will, of course, be appreciated that the ring 20 is made of an appropriate metallic material, so that it possesses the requisite strength to grip the wheel. In addition due to the fact that the inner peripheral portions of the ring are not in engagement with the wheel body, these portions do not have to take into consideration variations in the contour or placement of the wheel parts usually permitted under manufacturing tolerances.

The present application is a continuation-in-part of my application Serial No. 791,310, filed December 12, 1947, now abandoned.

It will be understood that modifications and variations may be effected without departing from the scope of the novel concepts of the present invention.

I claim as my invention:

1. In a wheel structure including a wheel having a multi-flanged tire rim and a body part, an annular trim ring comprising concentric radially inner and outer portions of curved cross section having at their junction a tire rim contacting portion for maintaining both the inner and the outer ring portions out of contact with the rim and for centering the ring on the wheel, said inner portion terminating in overlying close proximity to but spaced from the wheel body part and having its inner margin turned inwardly back on itself, the turned back portion being formed into rim engaging means for retaining the ring on the wheel.

2. In a wheel structure including a wheel having a multi-flanged tire rim and a body part, an annular trim ring comprising concentric radially inner and outer curved portions having at their junction a tire rim contacting portion for maintaining both the inner and the outer ring portions out of contact with the rim and for centering the ring on the wheel, said inner portion terminating in overlying proximity to but spaced from the wheel body part substantially radially inwardly from the tire rim and having its inner margin turned inwardly back on itself, the turned back portion being formed into a plurality of concealed tire rim engaging elements for retaining the ring on the wheel and said elements comprising springy fingers extending radially and axially outwardly from the wheel body part behind the inner portion of the trim ring and said inner margin of the trim ring defining a space between it and the body part.

3. In a wheel structure including a multi-flange tire rim having an intermediate generally axially outwardly and radially outwardly sloping flange and a terminal flange directed generally radially and then axially outwardly and defining a grooved arrangement receptive a wheel balancing weight, the wheel also having a wheel body attached to the tire rim and disposed generally radially and axially inwardly relative to said intermediate and terminal flanges, a trim ring for the outer side of the wheel comprising a one-piece sheet metal body having an outer marginal convexly cross-sectioned rib-like annular portion, a radially inner concavely cross-sectioned annular portion of a width to extend from the juncture of the intermediate and terminal flanges of the tire rim into overlying relation to the wheel body substantially radially inwardly from juncture of the wheel body with the tire rim, said marginal and inner annular portions being related at their juncture to bear against the tire rim at juncture of the intermediate and terminal flanges and in such relationship to the tire rim as to maintain said marginal portion spaced from the terminal flange both axially outwardly and radially inwardly to afford full clearance for a wheel balancing weight and an attachment clip therefor, said inner portion of the trim ring having an inner underturned generally radially outwardly and axially inwardly divergently related flange held in assembly spaced from the wheel body, said inner underturned flange having a series of radially and axially outwardly directed retaining fingers engaging endwise with the intermediate flange of the tire rim for retaining the trim ring on the wheel.

References Cited in the file of this patent

UNITED STATES PATENTS

| | | |
|---|---|---|
| Re. 19,466 | Lyon | Feb. 12, 1935 |
| Re. 20,553 | Lyon | Nov. 16, 1937 |
| 1,948,273 | Lyon | Feb. 20, 1934 |
| 2,274,496 | Mulhern | Feb. 24, 1942 |
| 2,345,283 | Mulhern | Mar. 28, 1944 |
| 2,404,388 | Lyon | July 23, 1946 |